No. 881,410. PATENTED MAR. 10, 1908.
A. E. KAY.
VALVE STEM AND TIRE DEFLATION ALARM.
APPLICATION FILED AUG. 3, 1906.
2 SHEETS—SHEET 1.
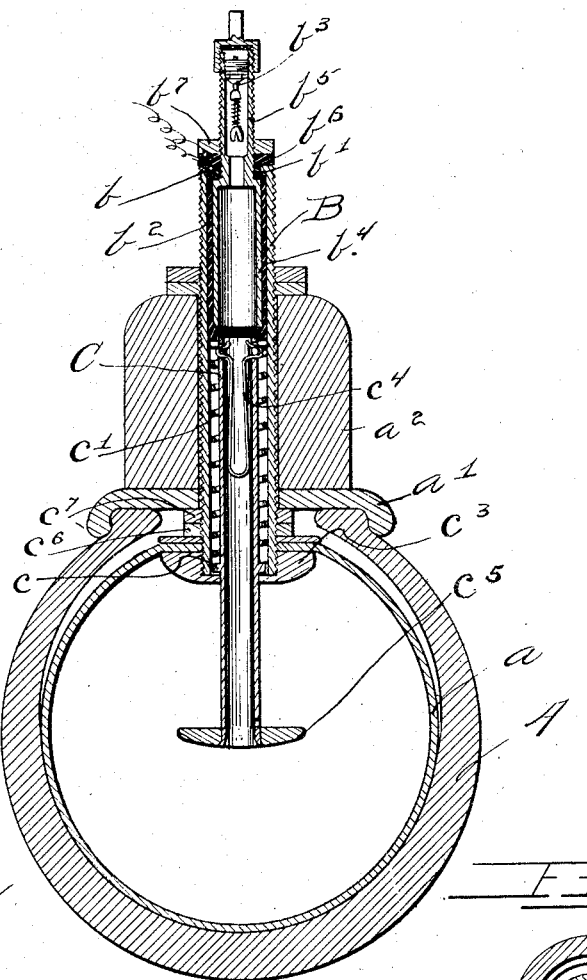
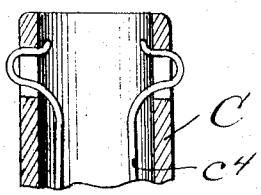
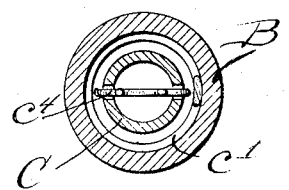

No. 881,410. PATENTED MAR. 10, 1908.
A. E. KAY.
VALVE STEM AND TIRE DEFLATION ALARM.
APPLICATION FILED AUG. 3, 1906.
2 SHEETS—SHEET 2.
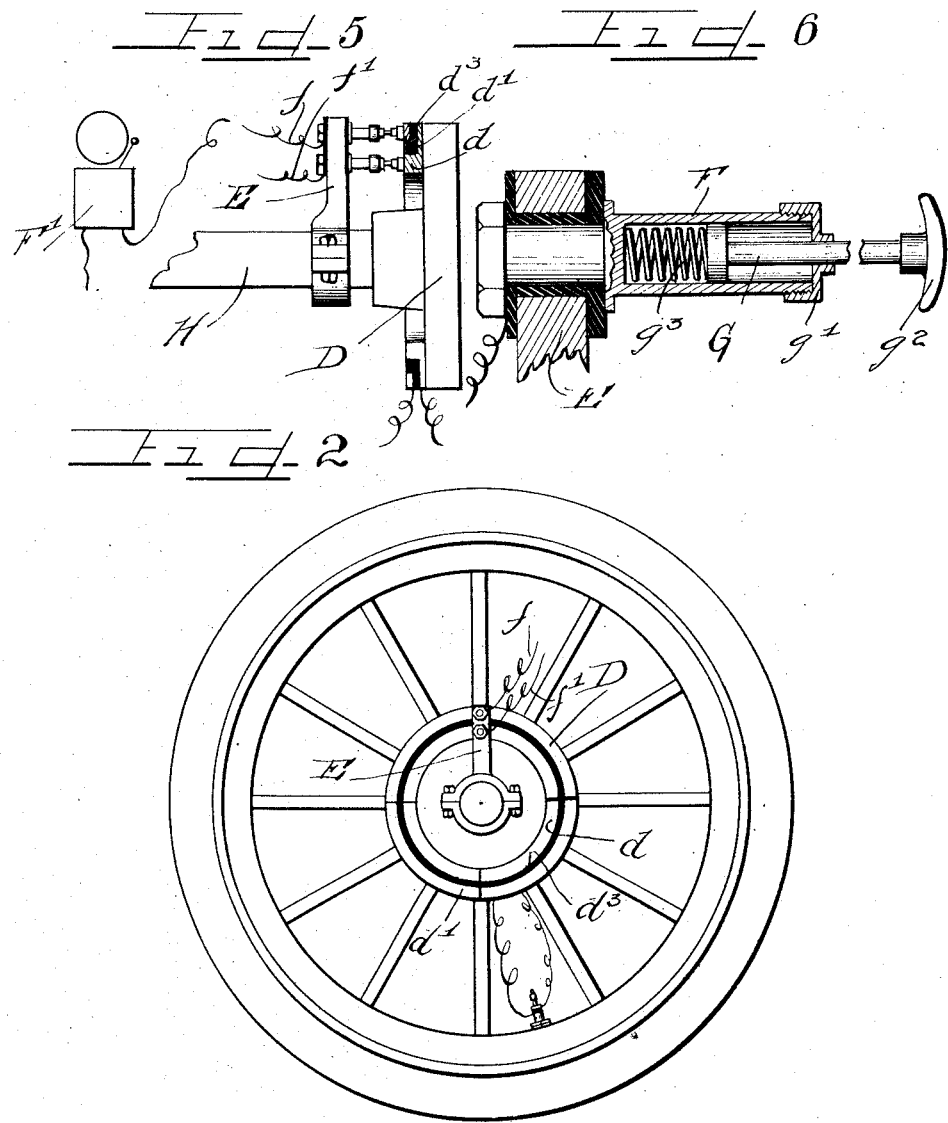

UNITED STATES PATENT OFFICE.

ABBOTT E. KAY, OF CHICAGO, ILLINOIS.

VALVE-STEM AND TIRE-DEFLATION ALARM.

No. 881,410.　　　Specification of Letters Patent.　　Patented March 10, 1908.

Application filed August 3, 1906. Serial No. 329,271.

*To all whom it may concern:*

Be it known that I, ABBOTT E. KAY, a citizen of the United States, and a resident of the city of Chicago, in the county of Cook and State of Illinois, have invented certain new and useful Improvements in Valve-Stems and Tire-Deflation Alarms; and I do hereby declare that the following is a full, clear, and exact description of the same, reference being had to the accompanying drawings, and to the letters of reference marked thereon, which form a part of this specification.

This invention relates to improvements in valve stems and tire deflation alarms, and more particularly to a device for signaling the deflation of a pneumatic tire.

Heretofore pneumatic tires have been extremely short lived. This is partly due to the fact that they are used when not sufficiently inflated, or because of puncture or a leaking valve the tire may be deflated or partly deflated and in this condition ruined because not noticed by the operator. Accidents of this kind are frequent and add greatly to the expense of automobile maintenance.

It is an object of this invention to provide a device adapted to be rigidly but removably attached to a pneumatic tire and which will instantly warn the operator of insufficient inflation.

It is a further object of this invention to provide an air valve stem provided with automatically operating means for notifying the operator if his tires are insufficiently inflated.

It is an important object of this invention to provide a device in which the parts are so arranged that they are adapted to assume a position approximately flush in the tire when the tire is entirely deflated thereby preventing injury to both the device and tire. This is very important as most devices of this class have a rigid extension into the tire and as a consequence when the tire is deflated over a certain limit the extension either cuts the tire destroying it or is broken by coming into contact with the ground.

It is finally an object of my invention to provide a device of the class described, cheap to manufacture, of few parts, easily assembled and adapted for use in any pneumatic tire.

The invention consists in the matters hereinafter described and more fully pointed out and defined in the appended claims.

On the drawings: Figure 1 is a longitudinal section of a device embodying my invention illustrating one method of engaging the same to the tire. Fig. 2 is a view of a tire and wheel and alarm. Fig. 3 is an enlarged transverse section of the air tube at the contacts. Fig. 4 is an enlarged detail of the method of engaging the spring contacts in the tube. Fig. 5 is an enlarged view illustrating one method of arranging the circuit between the tire and signal. Fig. 6 is a longitudinal section of one of the contacts with the hub.

As shown in the drawings: A, represents an outer tire casing of the usual or any kind and $a$ the inner tube. A rim $a'$, rigidly engages the edges of said casing therein and a felly $a^2$, is engaged thereto in the usual or any desired manner. Said felly and rim are constructed and secured together as usual and are provided with alined apertures therethrough to receive the air valve stem B, which as shown, is externally threaded as usual and is provided with an inwardly directed flange $b$ at its outer end.

An insulating sleeve $b^2$, of fiber or other suitable material lines the upper end of said stem, and is flanged inwardly at the bottom. An insulating washer $b'$ engages the flange $b$ from beneath, and is firmly held in place by the insulating sleeve $b^2$. Fitted in said sleeve $b^2$ and seated on said lower flange is a metallic tube $b^4$, provided with an integral externally threaded tubular extension $b^5$, of smaller diameter, which extends upwardly through said washer $b'$, beyond the top of the stem and in the upper end of which is the usual air valve $b^3$. An insulating washer $b^6$, of any suitable material is secured on said extension and is firmly held against the end of the stem B, by a metallic washer $b^7$, of suitable conductivity, between which and the insulating washer one of the circuit wires is engaged. The other wire is fastened between said insulating washer $b^6$, and the outer end of the stem.

Slidably engaged in said stem B, is a tube C, of smaller diameter than said tube $b^4$, provided near its middle, with an integral peripheral flange $c$. A spring $c'$, bears against the lower end of the insulating sleeve $b^2$, and said flange $c$, and normally holds said tube C at its lowest limit of movement. A nut $c^3$, engaged on the lower end of the stem B, projects into the inner tube and affords a stop for the flange $c$, thereby regulating the distance that the lower end of said tube C, can extend into the inner tube.

The tube C is provided at its upper end with oppositely disposed apertures and a leaf spring $c^4$, is engaged in said tube and its ends are bent to afford oppositely directed spring contacts which project through the respective apertures and contact with the tube $b^4$, when the tube C is telescoped therein.

As shown an apertured disk $c^5$, convex on its lower face is engaged in any suitable manner on the lower end of the tube C, and affords a broad bearing surface for the tread of the tube. A nut $c^6$ and jam nut $c^7$ firmly clamp the inner tube between the same and the nut $c^3$, securing the stem firmly to the inner tube. The stem is secured in the rim as usual.

Rigidly engaged to the hub D of each wheel are two metallic quadrants $d$—$d'$ insulated from each other by a fiber gasket $d^3$, or in any preferred way. A bracket E, is rigidly bolted to the axle H, and housings F one for each quadrant are rigidly secured thereto in any preferred manner and are insulated from each other. Slidable in each housing is a stem G, which extends through a retaining cap or head $g'$ on the housing and is provided on its outer end with a rounded head $g^2$, at all times held in position to contact one of said quadrants $d$—$d'$, by means of a spring $g^3$, which engages between the top of the housing F and the end of the stem. The circuit wires $f$—$f'$ lead to a suitable bell F' and if desired an annunciator on the dash, in convenient view of the operator.

The operation is as follows: The mechanism is assembled with the tire and the tire inflated bringing the head $c^5$, the desired distance from the tread, usually about the center of the inner tube. The wires are then connected between the hub and the end of the stem B, and washers $b^6$—$b^7$, and also the wires from the signal or bell with the housings on the bracket F. The circuit is normally opened because the contacts $c^4$ are held wholly within the stem B and are thus insulated from the lead wire, connected with the tube $b^4$. If the tire should lose air through any cause, immediately the tire flattens sufficiently to press against the disk $c^5$, the tube C telescopes the tube $b^4$, and the contacts $c^4$ are forced into engagement with the tube $b^4$, thereby closing the circuit when the quadrants contact the stems G, inasmuch as the spring contacts $c^4$, also contact the tube C and spring $c'$ and thence the stem B. The signal which may be of any preferred kind is thereby actuated from any suitable battery or source of current connected in the circuit. Should the tire entirely collapse the tube C can never cut the tube owing to the fact that it telescopes into the tube $b^4$, a distance equal to the distance it extends into the tire.

While I have described the valve as integral with one of the contacts it is obvious that they may be separate if desired and any other changes may be made and I therefore do not desire to limit this application for patent as to details as obviously many changes may be made without departing from the principles of this invention.

I claim as my invention:

1. In a device of the class described the combination with an inner tube of a stem rigidly engaged thereto and having its inner end approximately flush with the tube, telescoping tubes, one rigidly engaged in the stem and insulated therefrom, the other slidable therein, spring contacts carried by the movable tube adapted to bear against the rigid tube to close a circuit.

2. In a device of the class described the combination with a pneumatic tire of a valve stem removably engaged thereto, telescoping tubes in said stem adapted to be actuated by the deflation of the tire, contacts movable with one of said tubes to contact the other tube, said stem being approximately flush with the inside of the tire and a rounded nut secured on the end of said stem.

3. The combination with a pneumatic tire of a valve stem engaged thereto, an insulated tube in said stem, a tube in said stem projecting into the tire and adapted to telescope said insulated tube, spring contacts carried by the movable tube to close a circuit, said stem and telescoping tube adapted to assume a position approximately flush with the tire when said tire is entirely deflated.

4. In a device of the class described the combination with a stem of a tube in the upper end thereof and insulated therefrom, an integral extension on said tube provided with a valve therein, a spring contact normally out of engagement with said tube adapted when forced into contact therewith to complete the circuit and means normally holding the spring contact at its lower limit of movement.

5. An automatical signaling device comprising in combination with a tire a stem, a tube insulated therefrom and engaged in the upper end thereof, a tube in the lower end of said stem and normally extending into the tire and adapted when actuated to telescope in the first mentioned tube, contacts carried by said lower tube, a flange on said lower tube and a spring bearing against the same normally holding the contacts out of engagement.

6. An automatical tire deflation signaling device comprising a stem of telescoping tubes therein, an insulating sleeve between one of the tubes and stem and of greater length than the tube, contacts engaged to the other tube, a flange on one of said tubes, means bearing against the same and said sleeve, normally holding the tubes out of telescoping engagement and securing the sleeve in position and a rounded head on the lower tube.

7. In a device of the class described the combination with a pneumatic tire of a stem engaged thereto, telescoping tubes in said stem one of which normally extends into the tire and is adapted to telescope the other tube the same distance it extends into the tire and when fully telescoped to be approximately flush with the tire, contacts carried therewith, a spring in the stem adapted to force one of said tubes into the tire, said tubes admitting the air therethrough when inflating the tire.

8. In a device of the class described the combination with a tire of a valve stem rigidly engaged therein at its lower end and nearly flush with the inner wall of the tire, a tube in the upper end of said sleeve and insulated therefrom, an integral extension on said tube projecting from the end of said sleeve and cored to afford a valve chamber, a tube in the lower end of said stem, spring contacts engaged thereto, adapted when the lower tube is actuated to engage the upper tube and means normally holding the lower tube at its lowest limit of movement.

9. The combination with a tire of a stem engaged at its lower end therein and approximately flush with the inner wall thereof telescoping tubes in said stem, one insulated therefrom and the inner one extending into said tire below the end of the stem, contacts carried on one of said tubes adapted when the same are telescoping to close a circuit, means holding the tubes out of engagement when the tire is properly inflated, said inner tube adapted to telescope said insulated tube, a distance equal to the distance the same extends into the tire.

10. In a tire alarm the combination with a circuit to the signal of a stem engaged to the tire, an upper tube therein and insulated therefrom, a lower tube in said sleeve extending into the tire a distance approximately equal to the length of said insulated tube, contacts engaged to said lower tube and movable therewith, said lower tube adapted as the tire loses air to telescope the upper tube thereby forcing the contacts into engagement, means limiting the upward movement of the lower tube and means adapted to force said lower tube to normal position.

11. The combination with a vehicle wheel and tire of a stem engaged to the tire, contacts in said stem one insulated therefrom and the other extending into the tire adapted when one is actuated to close a circuit, quadrants or plates engaged to the hub of said wheel and insulated from each other, a casing, a stem projecting therethrough, a spring forcing the stem outwardly, said stem adapted at each revolution of the wheel to bear against said plates, wires connecting the same and signal and wires one connecting the stem and one of said quadrants or plates and the other wire connecting the insulated contact in said stem with one of said quadrants or plates.

12. The combination with a wheel, tire and axle, of a stem in the tire, tubes therein and one insulated therefrom and the other extending into the tire, a plurality of quadrants or plates engaged to the hub of said wheel and insulated from each other, a bracket engaged to the axle adjacent the hub, housings rigidly engaged thereto and insulated from each other, a stem in each housing having a head on the outer end and each adapted at every revolution of the wheel to contact one of said quadrants or plates, wires connecting said stem and insulated tube with the respective quadrants or plates and wires connecting the housings and the signal.

ABBOTT E. KAY.

Witnesses:
WM. E. BUSSEAU,
JOHN G. LINNER.